(12) United States Patent
Chacko et al.

(10) Patent No.: US 10,445,811 B2
(45) Date of Patent: Oct. 15, 2019

(54) RECOMMENDATION ENGINE COMPRISING AN INFERENCE MODULE FOR ASSOCIATING USERS, HOUSEHOLDS, USER GROUPS, PRODUCT METADATA AND TRANSACTION DATA AND GENERATING AGGREGATED GRAPHS USING CLUSTERING

(71) Applicant: Tata Consultancy Services Limited, Mumbai (IN)

(72) Inventors: Viju Chacko, Kochi (IN); Satyanarayanan Ramaswamy, Santa Clara, CA (US); Shampa Sarkar, Mumbai (IN)

( * ) Notice: Subject to any disclaimer, the term of this patent is extended or adjusted under 35 U.S.C. 154(b) by 648 days.

(21) Appl. No.: 14/610,521

(22) Filed: Jan. 30, 2015

(65) Prior Publication Data
US 2016/0117752 A1    Apr. 28, 2016

(30) Foreign Application Priority Data
Oct. 27, 2014  (IN) .......................... 3399/MUM/2014

(51) Int. Cl.
*G06Q 30/02*  (2012.01)
*G06Q 30/06*  (2012.01)

(52) U.S. Cl.
CPC ..... *G06Q 30/0631* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 5,369,571 A | | 11/1994 | Metts |
| 6,334,127 B1 * | | 12/2001 | Bieganski ......... G06F 17/30867 |
| 9,792,658 B1 * | | 10/2017 | Vijendra ................ G16H 10/60 |
| 2004/0143600 A1 * | | 7/2004 | Musgrove ......... G06F 17/30864 |
| 2007/0255707 A1 * | | 11/2007 | Tresser ............. G06F 17/30592 |
| 2008/0270363 A1 * | | 10/2008 | Hunt ................ G06F 17/30489 |

(Continued)

OTHER PUBLICATIONS

Huang, Zan, Daniel D. Zeng, and Hsinchun Chen. "Analyzing consumer-product graphs: Empirical findings and applications in recommender systems." Management science 53.7 (2007): 1146-1164. (Year: 2007).*

*Primary Examiner* — Marissa Thein
*Assistant Examiner* — Michelle T Kringen
(74) *Attorney, Agent, or Firm* — Seed IP Law Group LLP

(57) ABSTRACT

A method for providing recommendations for customers is described. The method comprises obtaining transaction data associated with one or more products being purchased by a customer. The method further comprises generating a customer household graph, wherein the customer household graph comprises a customer household node associated with the customer, a product superset node, and one or more product nodes associated with the product superset node. Further, at least one product metadata node associated with each of the one or more product nodes is determined. Further, at least one user node is associated with the customer household node based on the at least one product metadata node. Further, a user group node associated with the customer household node is determined based on the at least one user node. Further, one or more recommendations to be provided to the user are ascertained.

13 Claims, 13 Drawing Sheets

(56) References Cited

U.S. PATENT DOCUMENTS

| | | | | |
|---|---|---|---|---|
| 2009/0012971 A1* | 1/2009 | Hunt | ............ | G06F 17/30592 |
| 2010/0049538 A1* | 2/2010 | Frazer | ............ | G06Q 30/02 |
| | | | | 705/14.4 |
| 2010/0169328 A1* | 7/2010 | Hangartner | ............ | G06Q 30/02 |
| | | | | 707/751 |
| 2011/0251875 A1* | 10/2011 | Cosman | ............ | G06Q 10/087 |
| | | | | 705/7.31 |
| 2015/0206222 A1* | 7/2015 | Bart | ............ | G06Q 30/0631 |
| | | | | 705/26.7 |
| 2017/0220693 A1* | 8/2017 | Bruich | ............ | G06F 17/30339 |
| 2017/0228808 A1* | 8/2017 | Kumar | ............ | G06Q 30/0631 |

\* cited by examiner

| Field | Type | Null | Key | Default |
|---|---|---|---|---|
| ProductId | int(4) | NO | PRI | NULL |
| category | varchar(1000) | YES | | NULL |
| SubCategory | varchar(30) | NO | | NULL |
| FurtherSubCategory | varchar(30) | YES | | NULL |
| ProductName | varchar(1000) | YES | | NULL |
| Brand | varchar(30) | NO | | NULL |
| Weight | varchar(30) | NO | | NULL |
| Price | decimal(10,0) | NO | | NULL |
| MaxQty | int(2) | YES | | NULL |
| Budget | varchar(10) | NO | | NULL |
| Age | varchar(10) | YES | | NULL |
| Gender | varchar(3) | YES | | NULL |
| JunkFood | varchar(5) | YES | | NULL |
| DrinkType | varchar(20) | YES | | NULL |
| ProductCookType | varchar(20) | YES | | NULL |
| BookType | varchar(20) | YES | | NULL |
| FoodType | varchar(20) | YES | | NULL |
| CosmeticType | varchar(20) | YES | | NULL |
| HygieneType | varchar(20) | YES | | NULL |
| NutrientType | varchar(25) | YES | | NULL |
| VehicleRelatedProduct | varchar(20) | YES | | NULL |
| PetFoodType | varchar(10) | YES | | NULL |
| BeachProductType | varchar(10) | YES | | NULL |

Figure 5

| 9020 | instant food product,food product | burger | NULL | Chick n Moo chicken burger | Chick n Moo | | 7 | 2 | | NULL | NULL | NULL | NULL | NULL | NULL | NULL | NULL | NULL | NULL | NULL | NULL | NULL |

| 9019 | food product,instant food product | pasta | NULL | Ina Garten penne pasta with five cheese | Ina Garten | | 9 | 4 | | NULL | NULL | NULL | NULL | NULL | NULL | NULL | NULL | NULL | NULL | NULL | NULL |

| 9004 | preschooler product,toys and games,premium product,premium toys and games | Doll | NULL | Barbie Potty Training Taffy Barbie Doll and Pet | Barbie | | 19 | 2 | | PRESCHOOL | NULL | NULL | NULL | NULL | NULL | NULL | NULL | NULL | NULL | NULL | NULL | NULL |

| 9018 | automotive product,car maintenance product,car product | carwash | NULL | MOTHERS 05664 California Gold Car Wash 64 oz | MOTHERS | | 16 | 2 | | NULL | NULL | NULL | NULL | NULL | NULL | NULL | NULL | NULL | NULL | NULL |

Figure 6

RECOMMENDATION ENGINE COMPRISING AN INFERENCE MODULE FOR ASSOCIATING USERS, HOUSEHOLDS, USER GROUPS, PRODUCT METADATA AND TRANSACTION DATA AND GENERATING AGGREGATED GRAPHS USING CLUSTERING

TECHNICAL FIELD

The present subject matter relates, in general, to providing recommendations for customers and, particularly but not exclusively, to a recommendation engine for providing recommendations for customers.

BACKGROUND

Today's world envisions 'personalization'. Hence, to digitize or automate a personalized service, knowledge harvesting about an individual person or entity is essential, which goes beyond the traditional data analytics and leads to the domain of Artificial Intelligence based Knowledge Management and Knowledge Harvesting. For e.g., in today's Retail industry, understanding the buying behavior of a customer about the products being purchased/searched is essential from business profitability perspectives, however is a complex problem, being influenced by several interdependent parameters.

Retailers around the world would leverage prior consumer purchase data to perform various data analytics and mining to derive meaningful/beneficial business parameters. Many of these analytics yield better performance when retailers would be able to track their revisiting customers. Retailers employ different techniques to track their repeating/revisiting customers such as: incentivizing customers who take part in loyalty membership programs, capturing a part of/or a digest of their payment instruments (like credit card, debit card etc.), providing faster self-check-out facilities that take only plastic instruments for payments, etc., so that a revisiting customer could be tracked and their transactions be tagged together. Modern Retail Systems and Web Applications facilitating such activities are thus primarily based on the 'historic data' of previous transactions and the current 'Recommendation Systems' orchestrate the designing methodologies comprising the 'Content based filtering' which captures products' features/capabilities correlations, the 'Collaborative Filtering' comprising similarity measure of consumers and/or products and a hybrid approach of the above two.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 5 illustrates a product table, in accordance with an implementation of the present subject matter;

FIG. 6 illustrates one or more sample rows of the Product table, in accordance with the present subject matter;

DETAILED DESCRIPTION

Figure 1A:
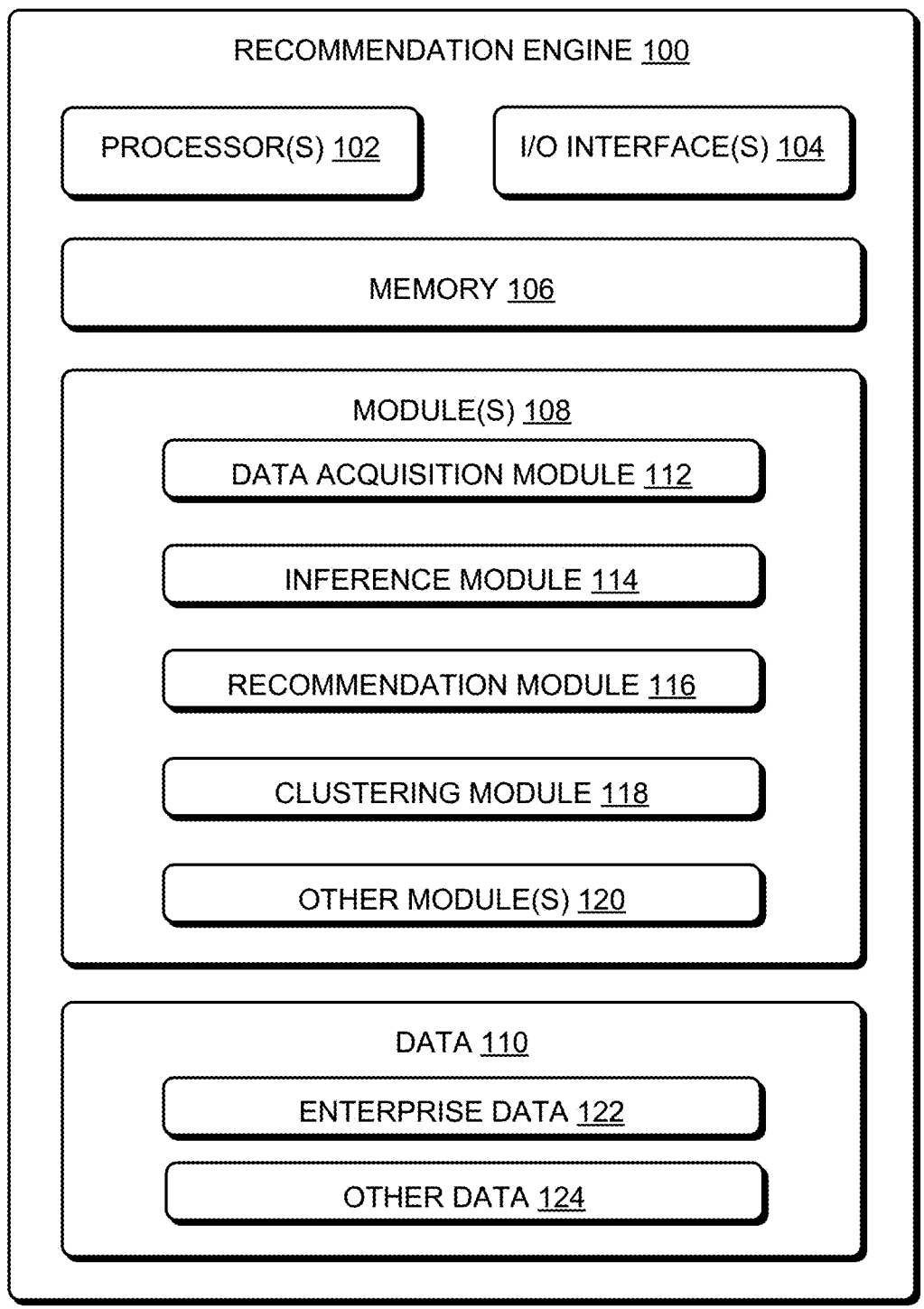
FIG. 1A illustrates a recommendation engine for providing recommendations for customers, in accordance with an implementation of the present subject matter.

The present subject matter relates to providing recommendations to customers, where no prior information or transaction history of the customer is known. It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of 'including', 'comprising' or 'having' and variations thereof, herein is meant to encompass the products listed thereafter and equivalents thereof as well as additional products. Further, the term 'Customer Household' and 'Customer' and the terms 'product' and 'item' have been used interchangeably and would refer the same entity or subject matter.

There are several cases, where, tracking of customers may not be feasible. For instance, in case the customer does not enroll for the membership or chooses to pay by cash, the tracking of customers may not be feasible. As a result, purchase history for the customer may not be recorded and providing recommendations for such customers may not be feasible. Further, owing to the sparse data, lack of scalability options with the pre-existing databases, rapidly changing user preferences, and customer-centric approach instead of product-centric approach, the existing recommendation engines are cumbersome to manage and operate.

The present subject matter describes systems and methods for providing recommendations for customers. According to an embodiment of the present subject matter, one or more recommendations to be provided to a customer may be ascertained without using purchase history associated with the customer. The recommendations may be understood as information indicative of products, discount offers, and services, of interest to the customer. Example of the recommendations may include, but are not limited to, products which the customer is likely to purchase, discount offers on other products and services, and the like. The purchase history may be understood as information indicative of products previously bought or searched by the customer. Ascertaining recommendations without using the purchase history facilitates in providing recommendations to customers in cases where no prior purchase history of the customers is available.

In an example, the customer may seek to purchase one or more products from an enterprise, say, from a retail store. In said example, without using the purchase history associated with the customer, one or more recommendations may be provided to the customer.

For providing the recommendations, in an implementation, transaction data associated with the products being purchased may be obtained, partly or fully, from a data repository. The data repository may comprise an enterprise level ontology, a customer level ontology, and a metadata repository. The enterprise level ontology may include information associated with a plurality of products being sold by the enterprise. For instance, the enterprise ontology may include product names, product brand names, product categories, and the like. The customer level ontology may include information associated with one or more probable customers of the products or one or more customer group or clusters of customer who showed affinity to the products. The metadata repository may include additional information associated with the products. For instance, nutrition content associated with an edible product may be stored in the metadata repository. The transaction data may be understood as information associated with the products being purchased. In an example, the transaction data includes product data, product metadata, spatial data, and temporal data. The product data includes product names, product brand names, product categories, and the like. The product metadata includes metadata associated with the products. The spatial data includes information associated with a location, such as a store address of the retail store, where the customer is purchasing the products. The temporal data includes a date and time of the purchase. As may be understood, the spatial data and the temporal data may be obtained in real time. In an implementation, the transaction data may obtained in real-time or in near-real time.

Based on the transaction data, a customer household graph may be generated. A Graph comprises nodes and edges or relations, wherein a node may further represent an entity or a fact or a value of an entity (string literal), and an edge or a relation connects two nodes by which the nodes are related. Such edges or relations may further be of general association relation, inheritance relation, constituent relation and the like. An inheritance relation connects a child node to its parent node by 'is*' or 'isA' relation, wherein the constituent relation comprises constituent of an entity or a fact and may be represented by 'has*' relation. The customer household graph comprises a customer household node associated with the customer, a product superset node, and one or more product nodes associated with the product superset node. Each of the product nodes represent a product being purchased by the customer. For example, say, the customer has selected an ABC deodorant, a PQR deodorant, and DEF diapers. In such a case, the corresponding product nodes may be an ABC deodorant node, a PQR deodorant node, and a DEF diapers node. In an example, the customer household graph may comprise one or more spatial nodes and temporal nodes. The spatial nodes and the temporal nodes represent the spatial and temporal data, respectively, associated with the purchase.

Thereafter, at least one product metadata node associated with each of the product nodes may be determined based on the transaction data. The product metadata node may represent product metadata associated with the product. For instance, for the ABC deodorant, corresponding product metadata, such as a sex type of a user of the ABC deodorant and a minimum age of the user of the ABC deodorant may be represented as product metadata nodes.

Further, based on the at least one product metadata node, at least one user node may be associated with the customer household node. The user node indicates a probable user of the product. In an example, based on the product metadata nodes, a first inference indicating the user may be performed. For instance, based on the sex type and the minimum age metadata nodes, it may be ascertained that the user is, say, a male of minimum age 21 years. As may be understood, for different products being purchased by the customer, different user nodes may be determined and associated with the customer household node. Thus, the customer household node may have one or more user nodes associated with it.

Subsequently, a user group node associated with the customer household node may be determined based on the at least one user node. The user group node may represent a user group comprising one or more users associated with the customer. Examples of the user group node may include, but are not limited to, a family, a bachelor, and the like. In an example, the user group node may be ascertained based on one or more predetermined rules. In another example, the user group node may be determined using a training dataset.

Thereafter, the recommendations to be provided to the customers may be ascertained using a recommendation training dataset. In an example, the recommendations may be ascertained based on the user group node. For instance, for the family user group node, using the recommendation training dataset, one or more products which a family (characterized by its corresponding user group nodes and user nodes) is likely to buy or existing offers on the same may be ascertained. Subsequently, the products or offers may be recommended to the customer through the recommendations. In an example, in addition to the user group node, the recommendations may be provided based on the transaction data. For instance, in an example where a customer residing in a tropical region, ascertained based on the spatial data, purchases, say, an umbrella, a sunscreen, slippers, and shorts, it may be inferred that the customer or the members of the user group are travelling to a region comprising beaches. In such a case, suitable recommendations, for example, hotels in nearby regions having beaches may be provided to the customer. In another example, event based recommendations may be provided to the customer. For instance, the recommendations may be ascertained based on the temporal node. In yet another example, the recommendations may be ascertained based on at least one of the user nodes, and at least one of user-recommendation training dataset or a pre-defined rule set.

Further, in an implementation, the user group node may be clustered into one or more clusters using known clustering mechanisms. In said implementation, each of the clusters may represent a group or set of similar user groups or customer households.

Thus, the present subject matter facilitates in ascertaining recommendations for customers without using their purchase history. As a result, recommendations for customers for whom no prior purchase history is available may be provided.

These and other advantages of the present subject matter would be described in greater detail in conjunction with the following figures. While aspects of described systems and methods for providing recommendations for customer can be implemented in any number of different computing systems, environments, and/or configurations, the embodiments are described in the context of the following device(s).

FIG. 1 illustrates a recommendation engine 100 for providing recommendations for customers, in accordance with an implementation of the present subject matter. The recommendation engine 100 hereinafter referred to as the engine 100, can be a workstation computer, a personal computer, a laptop, or a computing device. In an example, the engine 100 may provide recommendations to a customer for whom no prior purchase history is available.

In an implementation, engine 100 may include one or more processor(s) 102, I/O interfaces 104, and a memory 106 coupled to the processor 102. The processor 102 can be a single processing unit or a number of units, all of which could include multiple computing units. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

The I/O interfaces 104 may include a variety of software and hardware interfaces, for example, interfaces for peripheral device(s), such as a keyboard, a mouse, a display unit, an external memory, and a printer. Further, the I/O interfaces 104 may enable the engine 100 to communicate with other devices, such as a tag reader (not shown in the figure), other computing devices, and other external databases (not shown). The I/O interfaces 104 can facilitate multiple communications within a wide variety of networks and protocol types, including wired networks, for example, local area network (LAN), cable, etc., and wireless networks, such as Wireless LAN (WLAN), cellular network, or satellite. For the purpose, the I/O interfaces 104 include one or more ports for connecting a number of computing systems with one another or to a network.

The memory 106 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the engine 100 also includes module(s) 108 and data 110.

The module(s) 108, amongst other things, include routines, programs, objects, components, data structures, etc., which perform particular tasks or implement data types. The module(s) 108 may also be implemented as, signal processor(s), state machine(s), logic circuitries, and/or any other devices or components that manipulate signals based on operational instructions. Further, the module(s) 108 can be implemented in hardware, instructions executed by a processing unit, or by a combination thereof. The processing unit can comprise a computer, a processor, such as the processor 102, a state machine, a logic array, or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the module(s) 108 may be machine-readable instructions (software) which, when executed by a processor/processing unit, perform any of the described functionalities. The machine-readable instructions may be stored on an electronic memory device, hard disk, optical disk, or other machine-readable storage medium or non-transitory medium. In one implementation, the machine-readable instructions can be also be downloaded to the storage medium via a network connection.

In one implementation, the module(s) 108 further include a data acquisition module 112, an inference module 114, a recommendation module 116, a clustering module 118, and other module(s) 120. The other modules 120 may include programs or coded instructions that supplement applications and functions of the engine 100.

The data 110 serves, amongst other things, as a repository for storing data processed, received, and generated by one or more of the module(s) 108. The data 110 includes enterprise data 122 and other data 124. The other data 124 includes data generated as a result of the execution of one or more modules in the module(s) 108.

In an example, an enterprise may implement the engine 100 for providing recommendations to customers without using their purchase history. In said example, information associated with a plurality of products being offered by the enterprise, probable customer types for the products, and metadata associated with the products may be stored in the enterprise data 122. Based on the aforementioned information, the engine 100 may provide the recommendations to the customers.

In an embodiment, during operation, the tag reader may be used to identify one or more products being purchased by a customer. The spatial and temporal data may further be inputted by the user or would be automatically generated when a transaction entry occurs. Upon identifying the products, the data acquisition module 112 may obtain transaction data associated with the products being purchased from the enterprise data 122. The transaction data includes information associated with the products being purchased. For instance, the transaction data may include product data indicating, say, a name, a type, a category, a brand name of the products. The transaction data may further include product metadata associated with the products. For example, the transaction data may include, a nutritional value associated with edible products, a minimum age of use of the products, a sex type of a user of the products, and the like. Further, the transaction data may include spatial data and temporal data. The spatial data indicates a location associated with the purchase. For instance, in a case where the engine 100 is implemented in a retail store, the spatial data may include an address of the retail store. The temporal data may include a date and a time of the purchase.

In one of the embodiments, the transaction data may be represented as a graph DB layer over backend storage layer or repository. The graph layer may comprise nodes and edges, where a node denotes an entity or fact or data element and an edge connects two nodes with the relation between the entities or data. The properties of the nodes and edges may further be stored as (k,v) (key, value) pair for each node and each edge.

In another embodiment, the transaction data may be represented as objects corresponding to the aforementioned data, the associated metadata and their relationships in an Object Oriented Graph Database (OOGDB) with an object semantic layer built on top of the graph layer, which has been disclosed elsewhere. The object semantic layer is built with intelligence (rules) defining the concepts of inheritance of object (and the constituent of object), to mimic the real world entity. An object will have its properties stored in the respective object node in the underlying graph database as (key, value) pairs. To perform seek, create, edit or delete operation on an object, decomposition happens from the object node (and associated relations) to the corresponding nodes and edges in the graph layer to further down to the backend layer, and the data can be composed from therein for the purpose of retrieval. Those skilled in the art would appreciate that this is a mere elucidation of the way of data representation and storage and in no manner would limit the scope of the present subject matter.

Based on the transaction data, the data acquisition module 112 may generate a customer household graph comprising, a customer household node associated with the customer, a product superset node, and one or more product nodes. In an example, the data acquisition module 112 may link the product nodes with the product superset node using one or more relations. For instance, the data acquisition module 112 may link the product superset node with a product node, say, product node A with a corresponding relation 'hasProduct'. The data acquisition module 112 may further link the customer household node and the product superset node. In an example, the data acquisition module 112 may generate the customer household graph using an object oriented graph database. The Object layer of the Object oriented graph database directly maps the transaction data on to the graph and exposes data as real world entities or objects with their inheritance ('is*') relations, constituent ('has*') relations and general (association) relations, by a web service API ('*' can refer to word stemming.). When an user performs create/retrieve/update/delete operations on an object or a relation, the associated decomposition (for write) or composition (for read) happens from Object layer to the Graph Implementation layer (where the corresponding traversal, seek, assign, etc. happen to execute the required decomposition/composition operations). At the Graph DB/Graph Implementation layer, an object and its relations are stored as nodes and edges with their properties as (key, value) pairs. The decomposition and composition operations then further fetch the corresponding data from the backend data store or repository.

In another example, the data acquisition module 112 may generate the customer household graph using other known compatible databases or graph databases. In an implementation, the customer household graph may also comprise a spatial node and a temporal node generated by the data acquisition module 112. In said implementation, the data acquisition module 112 may generate the spatial node and the temporal node based on the spatial data and the temporal data, respectively. The spatial node represents the spatial data and the temporal node represents the temporal data. Based on the spatial node and the temporal node, one or more inferences for ascertaining the recommendations may be performed. In an implementation, the inference module 114 may determine at least one product metadata node associated with each of the product nodes based on the product data and corresponding product metadata stored in the transaction data. The product metadata node associated with a product indicates metadata associated with the product. In an example, the inference module 114 may access the enterprise data 122 and may subsequently obtain metadata corresponding to each of the products represented by the product nodes. Subsequently, the inference module 114 may represent corresponding metadata as product metadata nodes. Further, in said implementation, the inference module 114 may ascertain a relation between each of the product nodes and corresponding product metadata nodes. For instance, for a male deodorant A, represented by product node, say, deodorant A, the inference module 114 may determine that the deodorant A is a male deodorant, if the deodorant product has sex type 'male' associated as product metadata.

Thus, in such a case, the inference module 114 may determine a product metadata node, say, male deodorant. In said case, the inference module 114 may link the deodorant A with the male deodorant with a relation 'isA'. Further, in said implementation, the inference module 114 may compute a confidence value associated with the product metadata. The confidence value may indicate accuracy of identification of the product metadata node. For example, in the above case, the inference module 114 may ascertain that the deodorant A is a male deodorant with, say, eighty percent accuracy. In an example, the inference module 114 may store the customer household graph and the product metadata nodes as inference graph in the enterprise data 122.

Subsequently, the inference module 114 may ascertain a user node for each of the product metadata nodes. The user node may indicate a probable user of the product. For ascertaining the user, the inference module 114 may perform a first inference based on the product metadata node and the transaction data using a virtual agent, such as SA-Inf. The Sa-Inf facilitates in identifying the user of the product. The SA-Inf agent works on the Input data to generate at least one user node along with a confidence value, based on a predefined rule set or a training set. In one example, the predefined rule may be the 'A Male deodorant' may be used by Male with a confidence value eighty percent'. Hence, in the above example, the SA-Inf may identify the user to be a male. In another example, a training set may be existing which maps the Input to a set of User nodes, along with confidence values associated with them. For instance, if the user purchases an umbrella, a sunscreen, slippers, surfboard, and shorts in Mumbai in January, then product metadata node 'Beach-affinity', temporal metadata 'Winter Season' and Spatial metadata 'Humid region' act as input to the training set, which are mapped to the User Node 'beach traveler' with eighty percent confidence. Upon ascertaining the user of the product, the inference module 114 may associate the user node with the customer household node. In an example, the user nodes may be associated with the customer household node.

Thereafter, based on the user node, the inference module 114 may determine a user group node associated with the customer household node. The user group node indicates a user group comprising one or more users associated with the customer. In an implementation, the inference module 114 may trigger a virtual agent, such as SA-Agg for determining the user group node associated with the customer household node. In an example, the SA-Agg virtual agent may generate the user group nodes based on a predefined rule set. Further, one or more confidence values associated with the user group nodes may also be determined based on the predefined rule set. For example, in a case where the user nodes represent a male, a female, and a baby, the inference module 114 may ascertain the users may comprise a user group comprising the male, the female, and the baby. In said example, the inference module 114 may represent the user group as, say, a family, with eighty percent accuracy. In an example, the inference module 114 may store the inference graph, the user nodes, and the user group nodes as aggregated graph in the enterprise data 122.

Upon determining the user group node, the recommendation module 116 may ascertain one or more recommendations to be provided to the customer using a recommendation training dataset. The recommendations may include, for example, other products, existing offers being offered by the enterprise, other services, and the like. In an example, the recommendation module 116 may ascertain the recommendations based on the user group node. In another example, the recommendation module 116 may ascertain the recommendation based on the user nodes. In yet another example, the recommendation module 116 may ascertain the recommendations based on the transaction data. Upon ascertaining the recommendations, the recommendation module 116 may provide the recommendations to the customer.

Figure 1B:
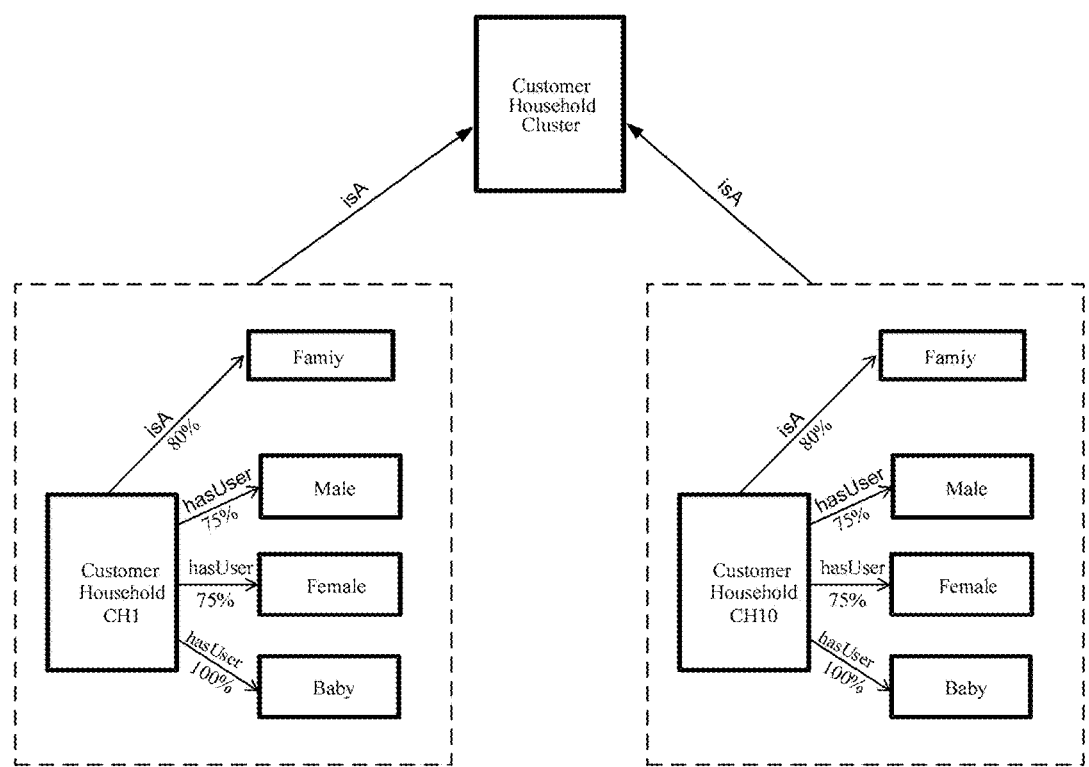
FIG. 1B illustrates a customer household cluster, in accordance with an implementation of the present subject matter.

In an implementation, the clustering module 118 may cluster the user group node into one or more clusters. For instance, the clustering module 118 may perform a similarity measure of the user group node and previously determined user group nodes. In a case where the similarity measure is above a predefined threshold, the clustering module 118 may cluster the user group nodes together in a single cluster as shown in FIG. 1B. The FIG. 1B illustrates a customer household node ch1 and a customer household node ch10 being clustered into a single customer household cluster.

Figure 1C:
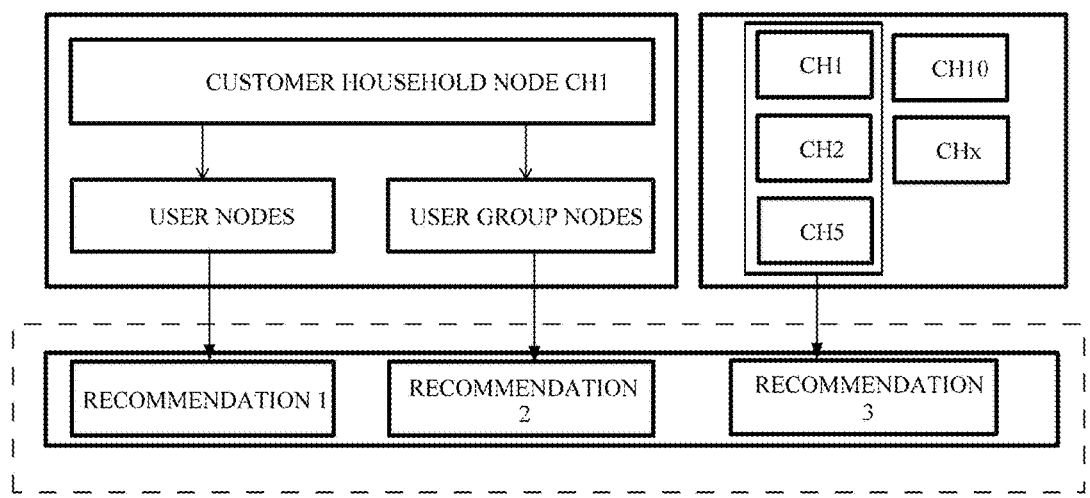
FIG. 1C illustrates exemplary recommendations, in accordance with an implementation of the present subject matter.

In an example, the recommendation module 116 may ascertain the recommendations based on at least one of the user node, the user group node, the cluster, and the recommendation training dataset. For instance, as illustrated in FIG. 1C, a recommendation 1 may be provided based on the user nodes, a recommendation 2 may be provided based on the user group nodes, and a recommendation 3 may be provided based on a cluster of customer household (CH) 1, CH 2, and CH 5.

Figure 2:
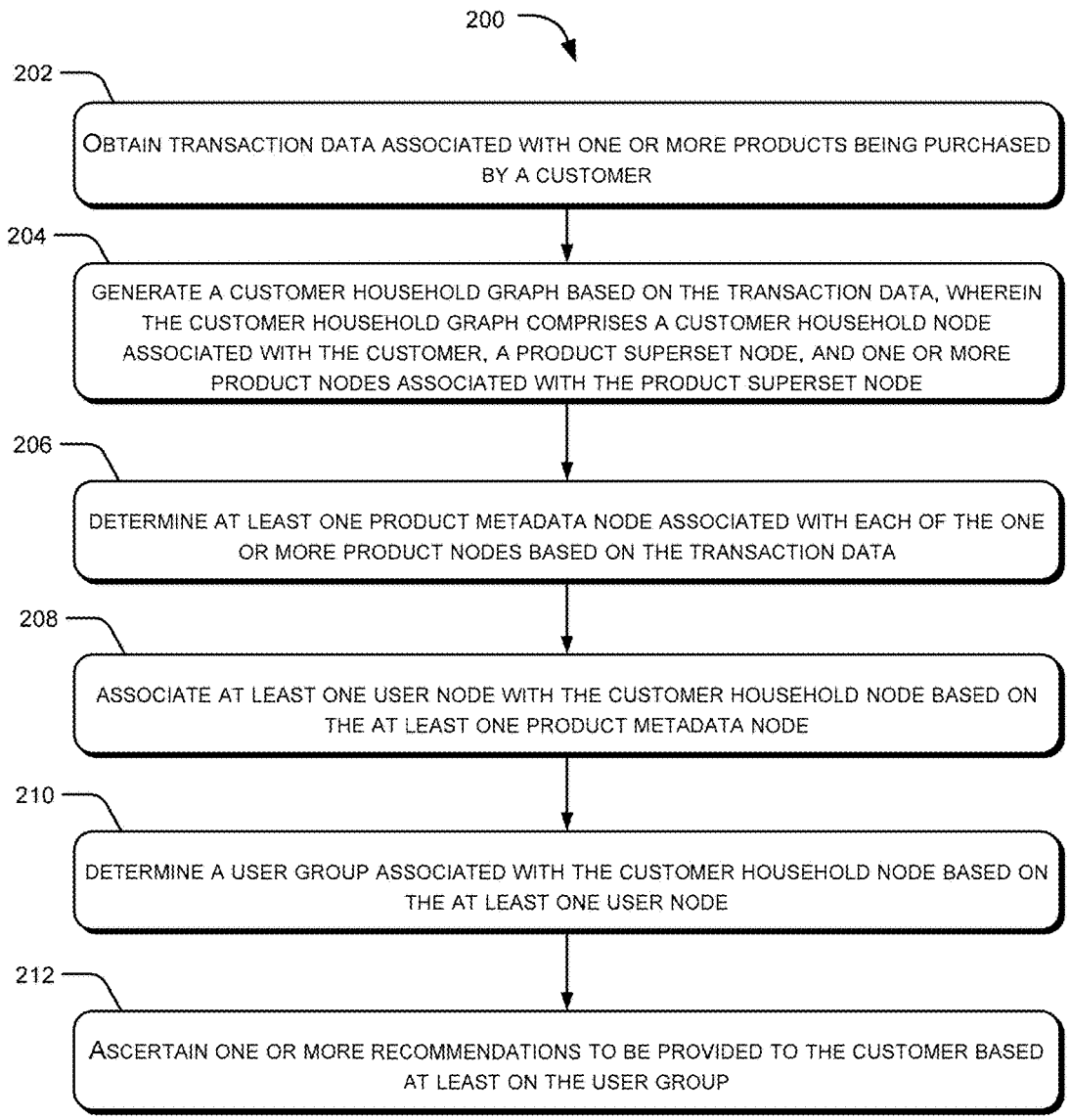
FIG. 2 illustrates a method for providing recommendations for customers, in accordance with an implementation of the present subject matter.

FIG. 2 illustrates a method 200 for providing recommendations to customers, according to an embodiment of the present subject matter. The order in which the method 200 is described is not intended to be construed as a limitation, and any number of the described method blocks can be combined in any order to implement the method or any alternative methods. Additionally, individual blocks may be deleted from the method without departing from the spirit and scope of the subject matter described herein. Furthermore, the method can be implemented in any suitable hardware, software, firmware, or combination thereof.

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

In an implementation, one or more of the methods described herein may be implemented at least in part as instructions embodied in a non-transitory computer-readable medium and executable by one or more computing devices. In general, a processor, for example, a microprocessor, receives instructions from a non-transitory computer-readable medium, for example, a memory, and executes those instructions, thereby performing one or more method, including one or more of the method described herein. Such instructions may be stored and/or transmitted using any of a variety of known computer-readable media.

Referring to FIG. 2, at block 202, transaction data associated with one or more products being purchased by a customer is obtained. The transaction data indicates information associated with the products. In an example, the transaction data may include product data, product metadata, spatial data, and temporal data. In an implementation, the data acquisition module 112 may obtain the transaction data.

At block 204, a customer household graph comprising a customer household node associated with the customer, a product superset node, and one or more product nodes associated with the product superset node may be generated based on the transaction data. In an example, the product nodes may be linked to the product superset nodes using one or more relations. In an example, the data acquisition module 112 may generate the customer household graph.

At block 206, at least one product metadata node associated with each of the product nodes may be determined based on the transaction data. The product metadata node represents product metadata associated with the product. In an example, the inference module 114 may determine the at least one product metadata node.

At block 208, at least one user node is associated with the customer household node based on the at least one product metadata node. Based on the product metadata and a virtual agent, such as SA-Inf, a user of the product may be ascertained. Subsequently, the user may be represented and associated with the customer household as the user node. In an example, the inference module 114 may associate the user node with the customer household node.

At block 210, a user group associated with the customer household node is determined based on the at least one user node. In an example, a virtual agent such as, the SA-Agg may be used to ascertain the user group based on the at least one user node. For example, the inference module 114 may trigger the virtual agent to ascertain the user group. The virtual agent may ascertain the user group based on a training dataset.

At block 212, one or more recommendations to be provided to the customer may be ascertained. In an example, a recommendation training dataset may be used for ascertaining the recommendations. In an implementation, the recommendation module 116 may ascertain the one or more recommendations.

Thereafter, the user group nodes may be clustered into one or more clusters using either a set of predefined rules based on semantic and/or probabilistic reasoning or unsupervised machine learning tools. In an example, the recommendations may be ascertained based on the cluster.

Figure 3A:
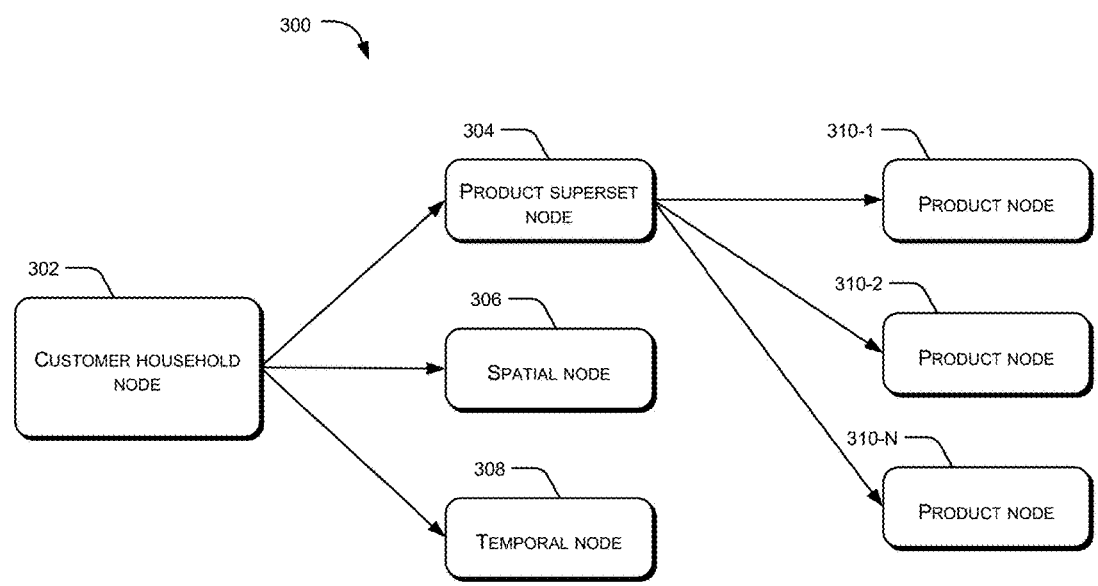
FIG. 3A illustrates a customer household graph in accordance with an implementation of the present subject matter.
Figure 3B:
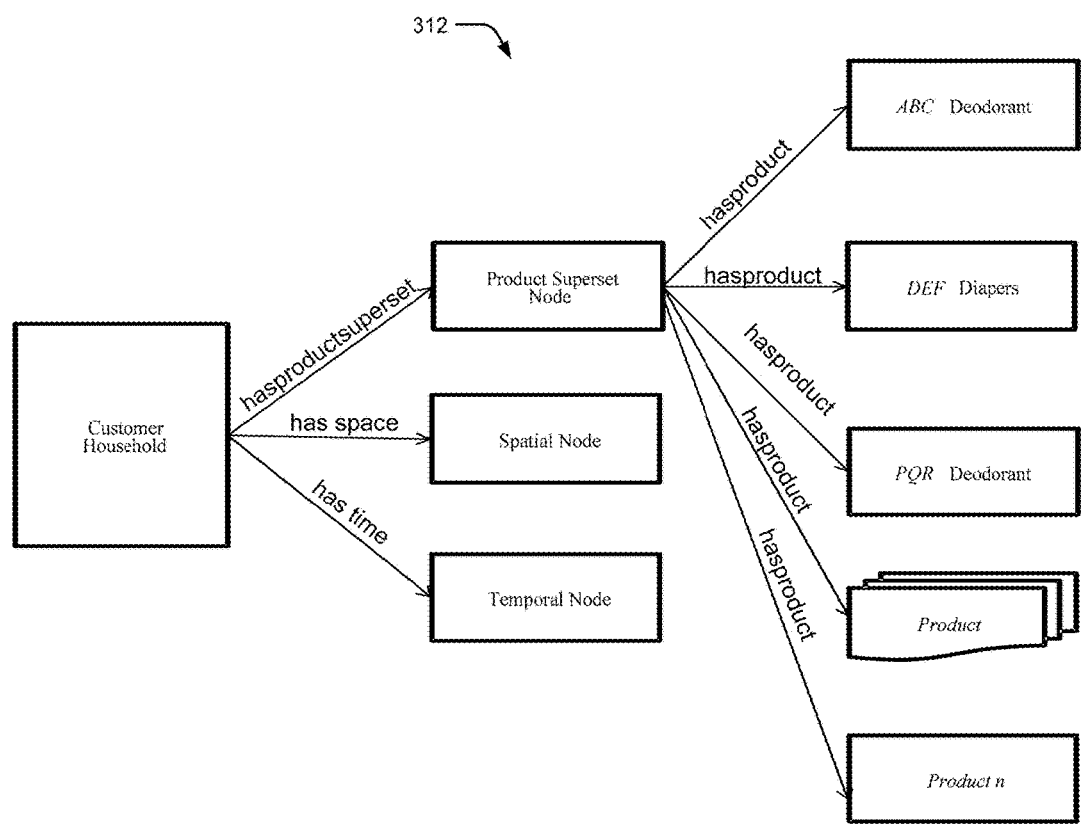
FIG. 3B illustrates a screenshot of the customer household graph, in accordance with an implementation of the present subject matter.

FIG. 3A illustrates an exemplary customer household graph 300, in accordance with an embodiment of the present subject matter. The customer household graph 300 comprises a customer household node 302 linked with a product superset node 304, a spatial node 306, and a temporal node 308. The customer household node 302 is associated with a customer making a purchase. The product superset node 304 comprises one or more product nodes 310-1, 310-2, . . . , and 310-N, collectively hereinafter referred to as product nodes 310, and individually referred to as product node 310. The product nodes represent one or more products being purchased by the customer. The spatial node 306 represents spatial data obtained in real time. The temporal node represents temporal data obtained in real time. An exemplary screenshot 312 of the customer household graph 300 has been shown in FIG. 3B. The FIG. 3B depicts a customer household graph in accordance with the present subject matter. The customer household graph shown in the figure comprises a product superset node, comprising products ABC deodorant, PQR deodorant and DEF diapers, and a few more products Product3, Product4, . . . Product n. Based on the transaction, product node and their relationships along with a Product superset node and a Customer Household Node gets generated. The Customer Household graph herein represents the Customer household, product superset, and the products as nodes and 'hasProduct' as relation between a 'product superset node' and a 'Product node'. Further, a relation 'hasProductSuperset' is established between a 'Customer Household node' and the 'Product superset node', as some of the exemplary elucidating nodes and relations. It is to mention here that in a graph layer representation, each of these nodes, viz., Product Node, Product Superset Node, etc. have further inheritance and constituent properties. For e.g., a 'Male Deodorant' is a 'male Product' and 'is a Deodorant', which are the parent nodes of the child 'Male Deodorant' node, which would inherit the properties of its parent nodes with the possibilities of overriding and overloading, Similarly, the 'Male Deodorant' node may have relations 'hasBrand', 'hasPrice' and the like, which forms the constituent relations.

Figure 4A:
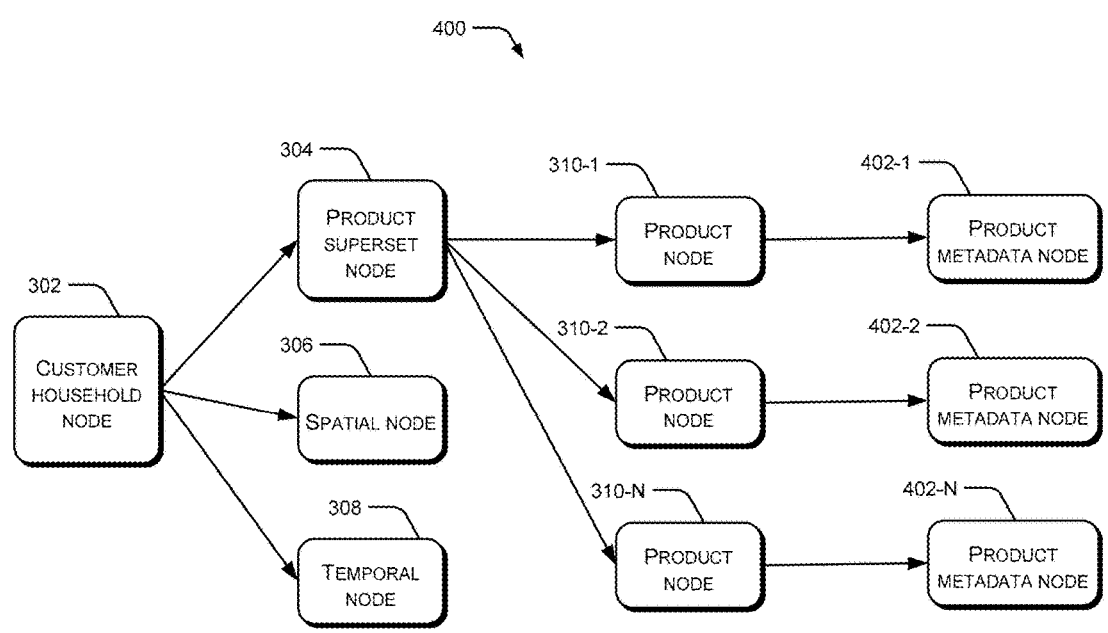
FIG. 4A illustrates an exemplary inference graph, in accordance with an implementation of the present subject matter.

FIG. 4A illustrates an inference graph 400, in accordance with an embodiment of the present subject matter. The inference graph 400 comprises the customer household graph 300 and one or more product metadata nodes 402-1, 402-2, . . . , 402-N, collectively hereinafter referred to as product metadata nodes 402 and individually referred to as product metadata node 402. In an example, the product metadata nodes may be generated based on the product metadata stored in a database (not shown). In an example, the product metadata nodes represents metadata associated with one or more products being purchased by the customer.

Figure 4B:
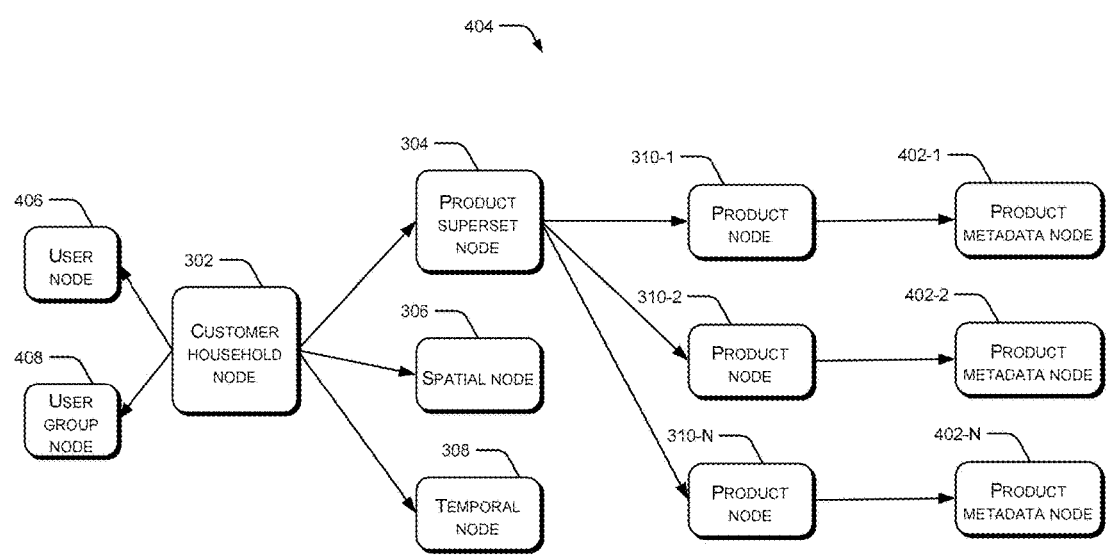
FIG. 4B illustrates an exemplary aggregated graph, in accordance with an implementation of the present subject matter.
Figure 4C:
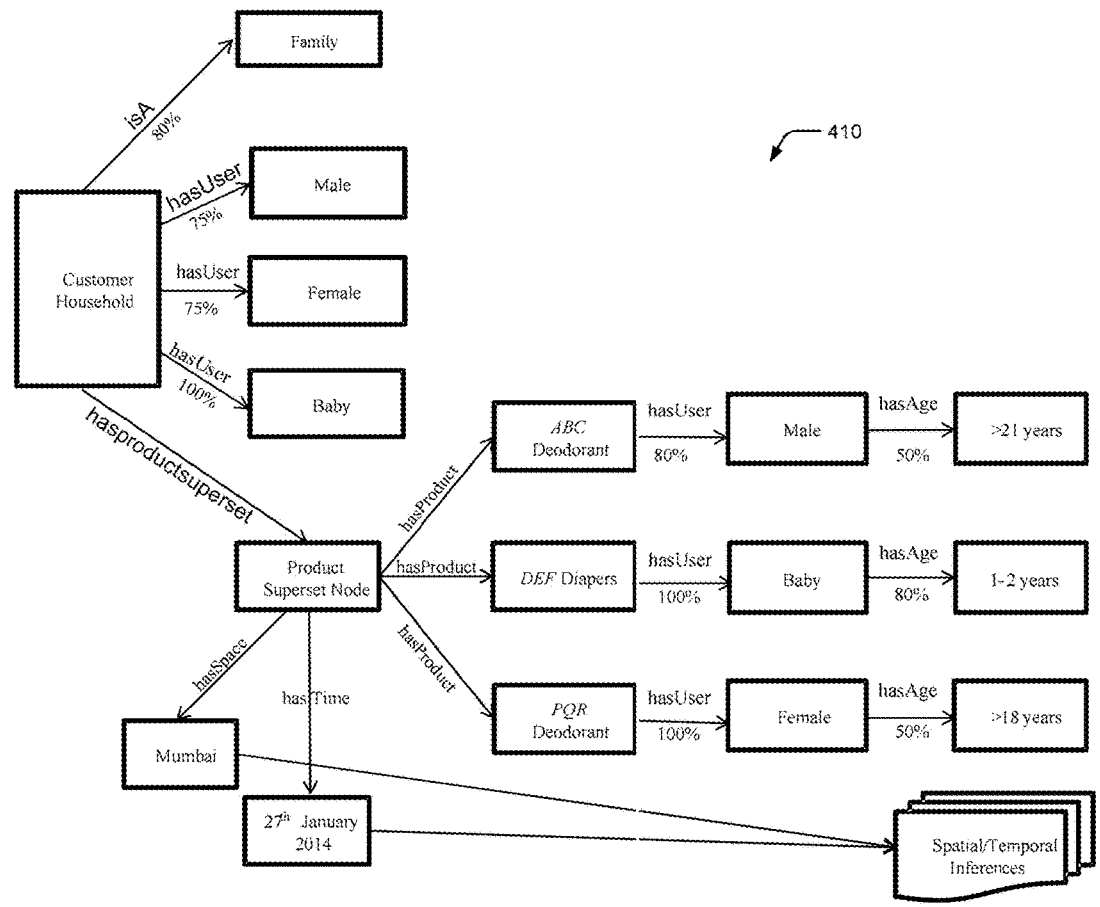
FIG. 4C illustrates a screen shot illustrating user nodes and user group node, in accordance with an implementation of the present subject matter.

FIG. 4B illustrates an aggregated graph 404, in accordance with an embodiment of the present subject matter. The aggregated graph 404 comprises a user node 406 and a user group node 408. FIG. 4C illustrates a screen shot 410 illustrating one or more user nodes and a user group node, in accordance with an implementation of the present subject matter. As shown in the figure, based on the ABC deodorant, the DEF diapers, and the PQR deodorant bought by the customer, it may be inferred that the customer household comprises a male, a female, and a baby. Further, one or more relations between the customer, along with corresponding confidence values have been shown. For instance, based on the aforementioned products being purchased, it may be inferred that the customer household has user male with 75% confidence value. Here 'has user' indicates the relation between the customer household and the male. Further, in an example, based on the user nodes, it may be inferred that the customer household is a family, which is a user group node, with 80% confidence value.

FIG. 5 illustrates a product table comprising one or more fields for storing information associated with a product being sold by an enterprise, such as a retail store, in retail ontology, in accordance with the present subject matter. In an example, the fields may be modified based on the requirements of the enterprise. FIG. 6 illustrates one or more sample rows of the Product table, in accordance with the present subject matter. The sample rows reflect product information.

Figure 7:
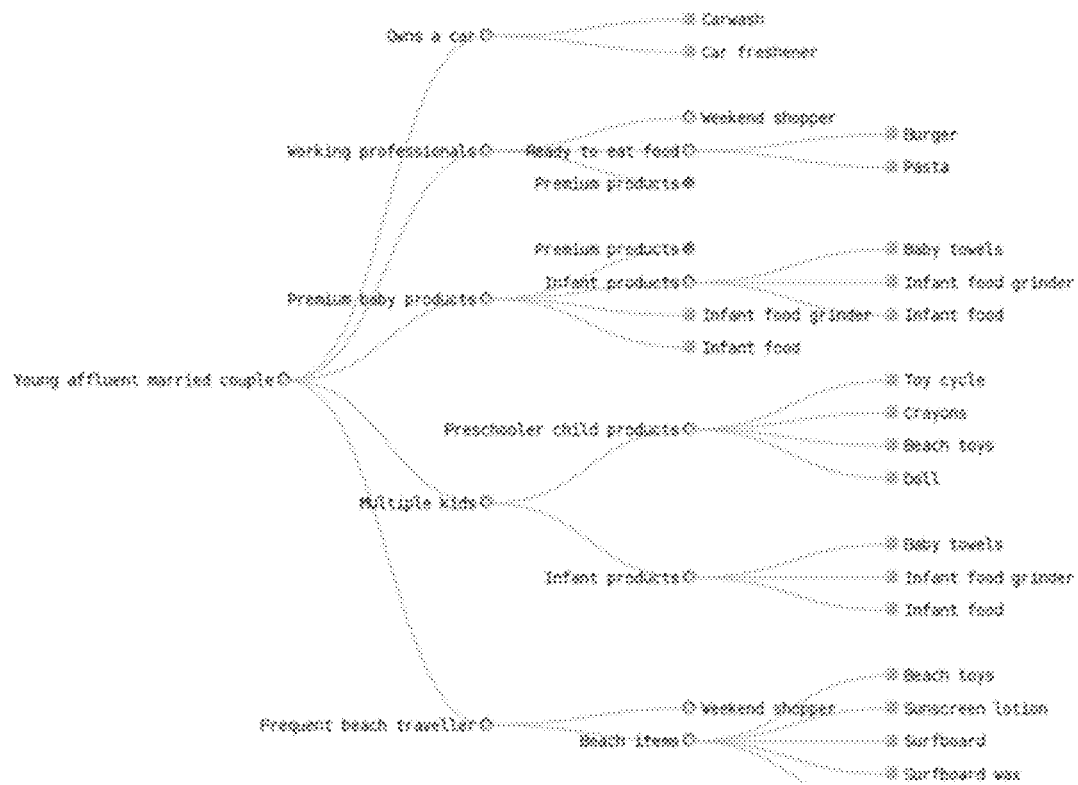
FIG. 7 illustrates a sample Inference Graph, in accordance with an implementation of the present subject matter.

FIG. 7 illustrates a sample Inference Graph, in accordance with the present subject matter. In the figure, one or more products are shown on the extreme right, whereas the level-wise Inferences drawn about a user group, herein referred to as a customer Household, are shown towards the left.

As mentioned previously, a virtual agent draws inferences based on a customer household graph comprising a customer household, a product superset node, and the products nodes. Further, a confidence value (not shown in the figure) is determined for each inference based on the data and metadata related to the products purchased by the customer and based on the spatial and temporal and other data of the transaction or purchase.

As an elucidation of the implementation of the Recommendation engine, FIG. 7 is a consolidated representation of the Inference Graph, constructed from right to left, where the products are shown in the extreme right, whereas the level-wise Inferences drawn about the Customer Household are shown towards the left. The Confidence Value is not visible in the figure, however, it is inherently considered at every level of Inference Generation. For instance, the fact that the customer household purchases a Carwash or Car freshener indicates that the Customer Household may own a car with 80% Confidence value.

Similarly, a Burger, or Pasta may indicate that the Customer Household prefers ready-to-eat foodstuff, which may further lead to a second level of Inference that the Customer Household may have Working Professionals, if coupled with other Inferences such as the Customer Household is a Weekend shopper or prefers Premium Products. Thus, SA-Agg would create singular or a plurality of 'aggregate inferences' for the Customer Household, each aggregate inference having confidence percentage incorporating the confidence percentages of SA-Inf level inferences. Other instances of Aggregate Inferences are that if the Customer Household is a Weekend shopper, and purchases Beach products, a second level of inference may be generated assuming that the Customer Household is a frequent beach traveler.

SA-Rule Engine further clusters or groups similar Customer Household based on the SA-Inf and/or SA-Agg. The deep inferences generated by SA-Inf and SA-Agg such as Owns a car, Working Professional, Premium Baby products affinity, Multiple Kids, and/or Frequent Beach traveller may lead to a cluster or group of customer Households with similar interests belonging to an Young affluent married couple Customer Household Group. They generally have a family oriented lifestyle, with infant kids, or planning to have kids, and hence, many of their purchases may include baby and children products.

Figure 8:
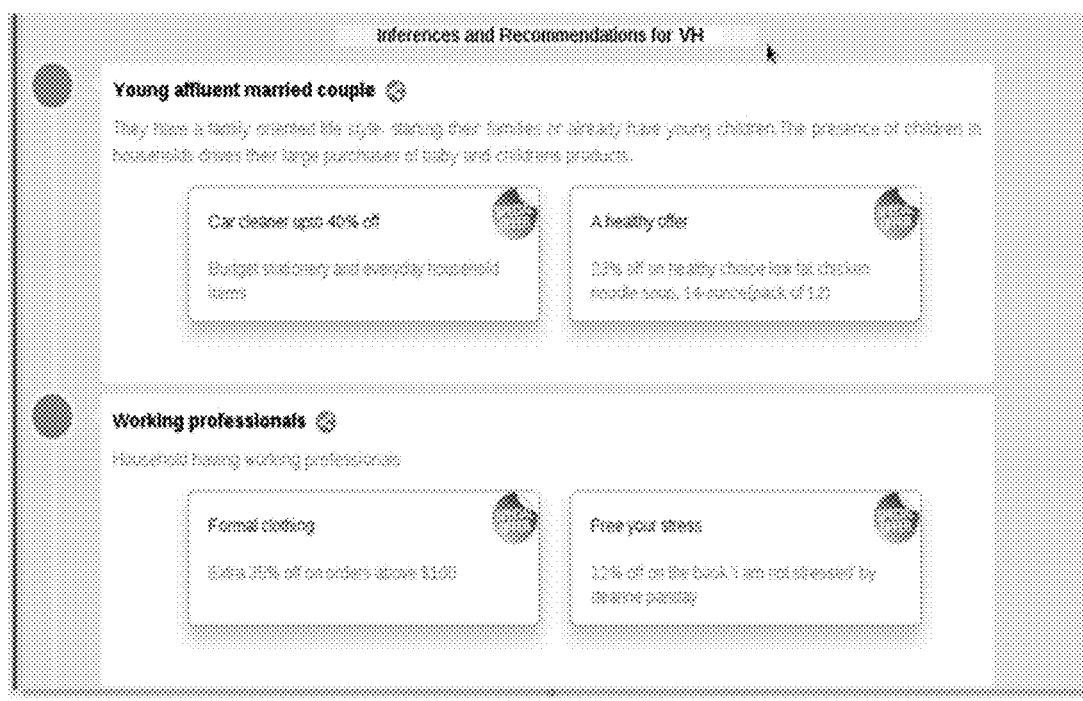
FIG. 8 illustrates a sample graphical user interface depicting recommendations for a customer, in accordance with an implementation of the present subject matter.

FIG. 8 illustrates a sample graphical user interface depicting recommendations for a customer, in accordance with the present subject matter. Recommendations can be provided by taking into account the inferences generated above. Consider the customer household group belongs to the Young affluent married couple cluster. If the customer household group owns a car, then discounts on Car Cleaner may be given as a recommendation. In an example, the Recommendation Engine 100 may also be used to mould the lifestyle of a customer Household from a junk-food lover to a health-conscious customer household group by giving attractive discounts on healthy and nutritious products, keeping certain attributes unchanged, for e.g., both are chicken products or from the same brand or having same spices, inferring from the buyer's preferences. Similarly, for Working Professionals, Recommendations can be given on the Formal apparels, which can further be personalized/recommended based on certain preference on Brand-affinity, size, Preferred colors, and Material of apparels by using a Maximal matching technique based on Confidence levels, thus leading to more personalized recommendation or product related offer generation, or even to the aspects of hyper-personalization, where the recommendations or offers can be stitched to each customer household group. In another implementation, the Enterprise can also tie up with other retailers, such as an online/offline Bookstore and provide recommendation of Suitable books by categorizing the customer household group accordingly. For instance, a discount on the Book 'I am not stressed' by Deanne Panday can be offered to Working Professionals.

Thus, the Recommendation Engine 100 comprises the inference module 114 and the recommendation module 116 incorporates the Deep learning and Probabilistic or Semantic reasoning principles by leveraging either of the pre-defined or customized Rule-based approach, or Supervised and/or Unsupervised Machine Learning tools to generate Customer Household group Recommendations for anonymous customers without any pre-historic data.

Although implementations for methods and systems for providing recommendations for customers are described, it is to be understood that the present subject matter is not necessarily limited to the specific features or methods described. Rather, the specific features and methods are disclosed as implementations for providing recommendations for customers.

We claim:

1. A recommendation engine comprising:
    a processor;
    a data acquisition module coupled to the processor to,
        obtain transaction data associated with one or more products being purchased by a customer in real-time, wherein the transaction data is represented as a graph database layer over a repository, and at the graph database layer an object and relations associated with the object are stored as nodes and edges and a write operation and a read operation fetches the transaction data from the repository;
        generate a customer household graph based on the transaction data, wherein the customer household graph comprises a customer household node associated with the customer, a product superset node associated with the customer household node by ascertaining one or more relations, and one or more product nodes associated with the product superset node, wherein each of the one or more product nodes represents a product from amongst the one or more products; and
    an inference module coupled to the processor to,
        determine at least one product metadata node associated with each of the one or more product nodes based on the transaction data by ascertaining a relation between each of the one or more product nodes and corresponding at least one product metadata node and compute a confidence value associated with the at least one product metadata, wherein the computed confidence value indicates accuracy of identification of the product metadata node, wherein the at least one product metadata node represents product metadata associated with the product;
        associate at least one user node with the customer household node by ascertaining the at least one user node based on the at least one product metadata node and the transaction data, wherein the at least one user node corresponds to the at least one product metadata, wherein the at least one user node is generated along with another confidence value, based on a predefined rule set or a training set, wherein at least one probable user of a product is represented and subsequently associated with the customer household node as the at least one user node;
        determine a user group node associated with the customer household node based on the at least one user node, wherein the user group node indicates a user group comprising one or more users associated with the customer household node; and
    a recommendation module coupled to the processor to ascertain one or more recommendations to be provided to the customer based on at least one of the user node, the user group node, a cluster of the user group nodes, and a recommendation training dataset,
    wherein the inference module stores the customer household graph and product metadata nodes as an inference graph, and also stores the inference graph, user nodes, user graph nodes as an aggregated graph,
    wherein the recommendation engine further comprises:
        a clustering module coupled to the processor to perform similarity measure of determined user group node and accordingly cluster the user group node into at least one cluster when the similarity measure is above a predefined threshold.

2. The recommendation engine as claimed in claim 1, wherein the data acquisition module further is to,
    generate a spatial node indicative of a location of the purchase, wherein the spatial node represents spatial data obtained in real-time; and
    generate a temporal node indicative of a time of the purchase, wherein the temporal node represents temporal data obtained in real-time.

3. The recommendation engine as claimed in claim 1, wherein the inference module ascertains the at least one probable user by performing a first inference based on the at least one product metadata node and the transaction data.

4. A method for providing recommendations for customers, the method comprising:
    obtaining transaction data associated with one or more products being purchased by a customer in real-time, wherein the transaction data is represented as a graph database layer over a repository, and at the graph database layer an object and relations associated with the object are stored as nodes and edges and a write operation and a read operation fetches the transaction data from the repository;
    generating a customer household graph based on the transaction data, wherein the customer household graph comprises a customer household node associated with the customer, a product superset node, and one or more product nodes associated with the product superset node by ascertaining one or more relations between each of the one or more product nodes and the product superset node, wherein each of the one or more product nodes represents a product from amongst the one or more products;
    determining at least one product metadata node associated with each of the one or more product nodes based on the transaction data by ascertaining a relation between each of the one or more product nodes and corresponding at least one product metadata node and computing a confidence value associated with the at least one product metadata node, wherein the computed confidence value indicates accuracy of identification of the product metadata node, wherein the at least one product metadata node represents product metadata associated with the product;

associating at least one user node with the customer household node by ascertaining the at least one user node based on the at least one product metadata node and the transaction data, wherein the at least one user node corresponds to the at least one product metadata node, wherein the at least one user node is generated along with another confidence value, based on a predefined rule set or a training set, wherein at least one probable user of a product is represented and subsequently associated with the customer household node as the at least one user node;

determining a user group node associated with the customer household node based on the at least one user node, wherein the user group node indicates a user group comprising one or more users associated with the customer household node; and ascertaining one or more recommendations to be provided to the user, wherein the customer household graph and product metadata nodes are stored as an inference graph, and the inference graph, user nodes, user graph nodes are stored as an aggregated graph, wherein the method further comprises:
performing similarity measure of the determined user group node and accordingly cluster the user group node into at least one cluster when the similarity measure is above a predefined threshold.

5. The method as claimed in claim 4, wherein the transaction data comprises product data, product metadata, spatial data, and temporal data, wherein the product data and the product metadata comprises information associated with the one or more products, and wherein the spatial data comprises information indicative of a location where the customer is purchasing the product, and wherein the temporal data comprises information indicative of a date and a time of purchase of the one or more products.

6. The method as claimed in claim 4, wherein the associating further comprises performing a first inference based on the at least one product metadata node and the transaction data for obtaining the at least one user node.

7. The method as claimed in claim 4, wherein the one or more recommendations are ascertained based on at least one of the user node, the user group node, the transaction data, one or more clusters, and a recommendation training dataset.

8. The method as claimed in claim 4, wherein the another confidence value is associated with the at least one user node, wherein the another confidence value indicates accuracy of identification of the user.

9. The method as claimed in claim 4, wherein a confidence value is associated with the user group node, wherein the confidence value indicates accuracy of determination of the user group.

10. The method as claimed in claim 4, wherein the method further comprises:
generating a spatial node indicative of a location of purchase of the one or more products, wherein the spatial node represents spatial data obtained in real-time; and
generating a temporal node indicative of a time of purchase of the one or more products, wherein the temporal node represents temporal data obtained in real-time.

11. A non-transitory computer-readable medium having embodied thereon a computer program for executing a method comprising:
obtaining transaction data associated with one or more products being purchased by a customer in real-time, wherein the transaction data is represented as a graph database layer over a repository, and at the graph database layer an object and relations associated with the object are stored as nodes and edges and a write operation and a read operation fetches the transaction data from the repository;

generating a customer household graph based on the transaction data, wherein the customer household graph comprises a customer household node associated with the customer, a product superset node, and one or more product nodes associated with the product superset node by ascertaining one or more relations between each of the one or more product nodes and the product superset node, wherein each of the one or more product nodes represents a product from amongst the one or more products;

determining at least one product metadata node associated with each of the one or more product nodes based on the transaction data by ascertaining a relation between each of the one or more product nodes and corresponding at least one product metadata node and computing a confidence value associated with the at least one product metadata node, wherein the computed confidence value indicates accuracy of identification of the product metadata node, wherein the at least one product metadata node represents product metadata associated with the product;

associating at least one user node with the customer household node by ascertaining the at least one user node based on the at least one product metadata node and the transaction data, wherein the at least one user node corresponds to the at least one product metadata node, wherein the at least one user node is generated along with another confidence value, based on a predefined rule set or a training set, wherein at least one probable user of a product is represented and subsequently associated with the customer household node as the at least one user node;

determining a user group node associated with the customer household node based on the at least one user node, wherein the user group node indicates a user group comprising one or more users associated with the customer household node; and ascertaining one or more recommendations to be provided to the user, wherein the customer household graph and product metadata nodes are stored as an inference graph, and the inference graph, user nodes, user graph nodes are stored as an aggregated graph, wherein the method further comprises:
performing similarity measure of the determined user group node and accordingly cluster the user group node into at least one cluster when the similarity measure is above a predefined threshold.

12. The non-transitory computer-readable medium as claimed in claim 11, wherein the transaction data comprises product data, product metadata, spatial data, and temporal data, wherein the product data and the product metadata comprises information associated with the one or more products, and wherein the spatial data comprises information indicative of a location where the customer is purchasing the product, and wherein the temporal data comprises information indicative of a date and a time of purchase of the one or more products.

13. The non-transitory computer-readable medium as claimed in claim 11, wherein the one or more recommendations are ascertained based on at least one of the user node, the user group node, the transaction data, one or more clusters, and a recommendation training dataset.

\* \* \* \* \*